March 18, 1958 E. R. NYLAND 2,827,300
APPARATUS FOR HOLDING WORK PIECES
Filed Feb. 16, 1956 5 Sheets-Sheet 1

INVENTOR.
EDWARD R. NYLAND
BY
*Barnes, Kisselle, Laughlin & Raisch*
ATTORNEYS.

March 18, 1958 E. R. NYLAND 2,827,300
APPARATUS FOR HOLDING WORK PIECES
Filed Feb. 16, 1956 5 Sheets-Sheet 2

INVENTOR.
EDWARD R. NYLAND
BY
Barnes, Kisselle, Laughlin & Raisch
ATTORNEYS.

INVENTOR.
EDWARD R. NYLAND
BY
ATTORNEYS

March 18, 1958     E. R. NYLAND     2,827,300
APPARATUS FOR HOLDING WORK PIECES
Filed Feb. 16, 1956     5 Sheets-Sheet 4
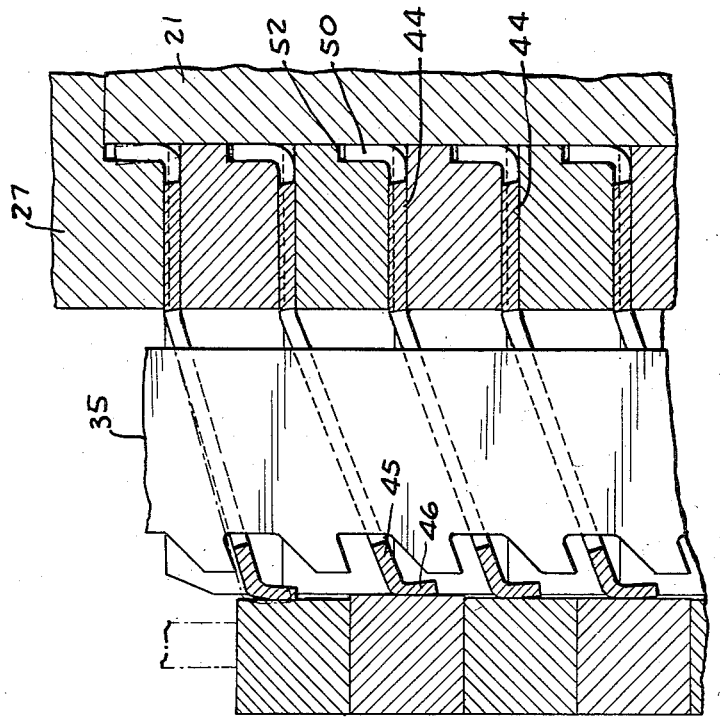
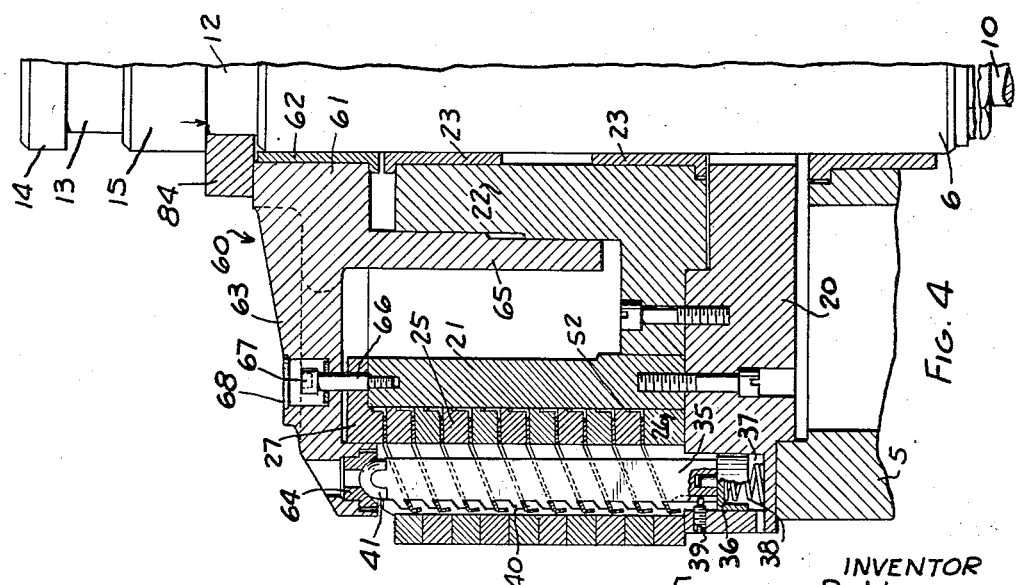
INVENTOR
EDWARD R. NYLAND
BY
Barnes Kisselle Laughlin & Rauch
ATTORNEYS.

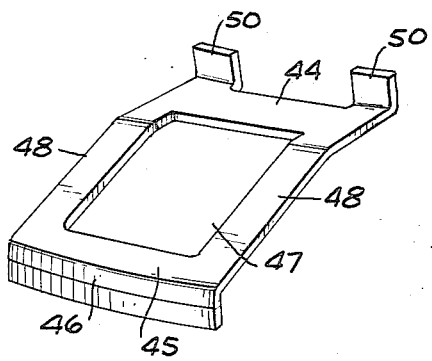
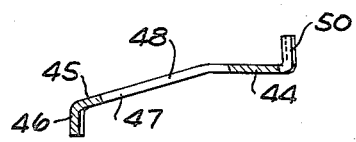
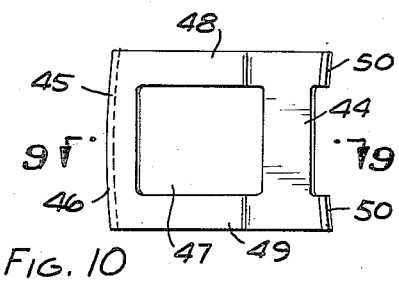
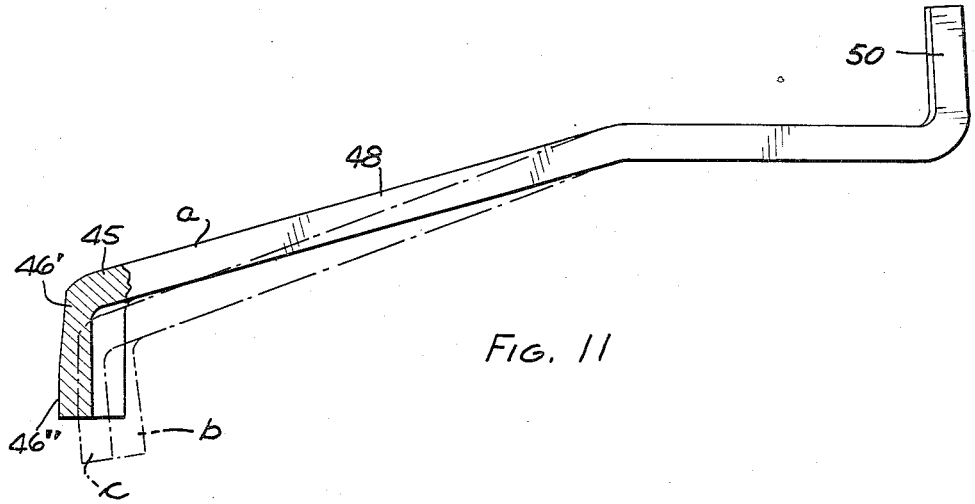

United States Patent Office 2,827,300
Patented Mar. 18, 1958

2,827,300

APPARATUS FOR HOLDING WORK PIECES

Edward R. Nyland, Detroit, Mich.

Application February 16, 1956, Serial No. 565,902

16 Claims. (Cl. 279—2)

This invention relates to an apparatus for holding work pieces upon which machine operations are to be performed.

The invention is directed more particularly to an apparatus for holding simultaneously a plurality of work pieces so that all work pieces may be acted upon while so held. A primary purpose of the invention is to provide a work holder for effectively holding work pieces in proper position even though individual work pieces may vary with respect to each other within the allowable tolerances. To this end, the work holder has individually acting gripping elements so that each work piece is individually engaged and properly located and held. Nevertheless, all such work pieces may be loaded with respect to the holding apparatus and substantially simultaneously gripped and held.

The invention is admirably exemplified in considering work pieces in the form of metal rings which are to have gear teeth cut into the outer peripheral portions thereof. Such rings, for example, are the so-called ring gears mounted upon engine fly wheels and which are usually employed for purposes of starting the engine. In the manufacture of the blank rings it necessarily follows that certain tolerances are permitted and to this end the rings may vary as to their internal diameter. In accordance with this invention a plurality of such blank rings may be placed in position with respect to the work holding apparatus with the rings stacked against each other, thus forming sort of a composite cylinder. When so held, machining operations, as for example by a gear forming device, may be performed on all the rings. But each ring must be properly centered and held in a proper centralized position. Since the rings have machine operations performed on their outer portions, they are held and centered from their inner surfaces and the holding apparatus of this invention engages and centers each ring individually regardless of variation of their internal diameter.

An apparatus constructed in accordance with the invention is disclosed in the accompanying drawings:

Fig. 4 is a sectional view taken on line 4—4 of Fig. 3 illustrating the action of assembling and centering the work pieces.

Fig. 5 is an enlarged sectional view showing, with some exaggeration, the manner in which the work pieces are centered.

Fig. 8 is a view of the flexible holding elements.

Fig. 9 is a sectional view taken through a flexible work engaging element.

Fig. 10 is a plan view illustrating a flexible work engaging element.

Fig. 11 is a view illustrating the manner in which the holding element flexes.

Figure 1:
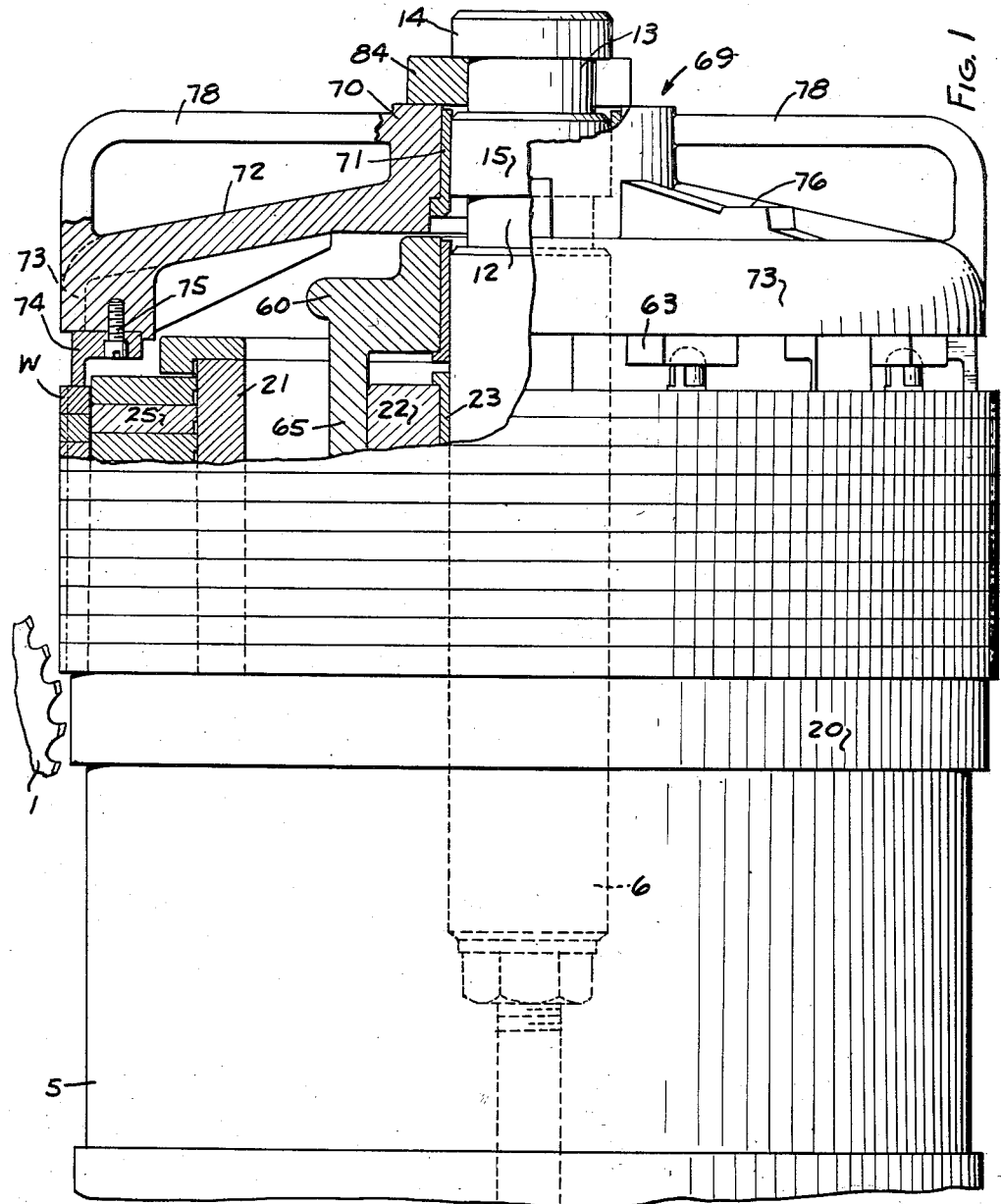
Fig. 1 is a general view with parts cut away and parts in section showing a plurality of work pieces in the form of rings held in position by the work holding apparatus and indicating a gear hobbing tool in position to cut gear teeth on the external surfaces thereof.

The work pieces, as shown herein, are illustrated at W, and it will be noted from Fig. 1 that ten of such work pieces are placed one upon another and thus form a cylindrical shape. The work pieces are held properly in such position and are to be acted upon by a suitable machining instrumentality such as a gear hobbing tool 1. Thus, with the plurality of work pieces held properly in position, the machining or cutting operation is performed more efficiently and rapidly as a number of work pieces can be acted upon with one setting or at one time, so to speak.

The apparatus comprises a suitable base 5 and there is an operating shaft 6 arranged to be shifted axially by suitable power means indicated herein as in the form of a piston 6 in cylinder 7 to which compressed air or hydraulic medium may be conveyed by conduits 8 and 9. The shaft 6 is connected to the piston by a suitable rod 10. The shaft 6 has a circumferential recess 12 and a circumferential recess 13 defined by heads 14, 15 and the body of the shaft.

Figures 6, 7:
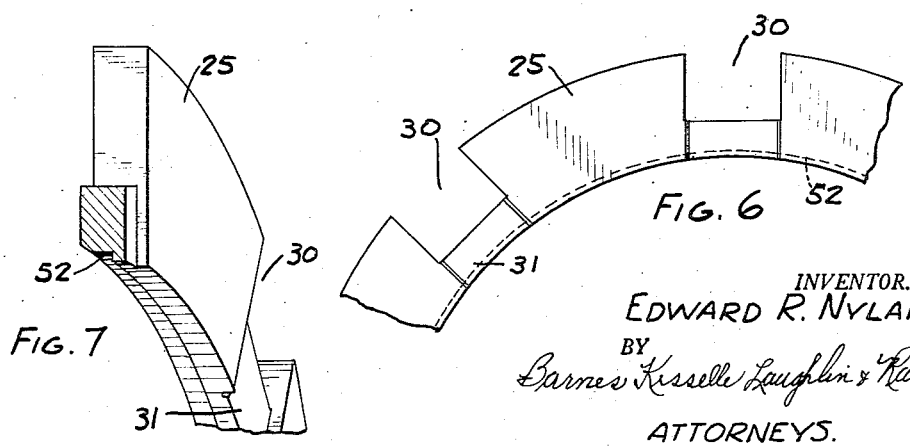
Fig. 6 is a partial plan view of a notched spacer ring.
Fig. 7 is a somewhat enlarged view partly in section illustrating a spacer ring.

Disposed upon the base or support 5 is a rest plate 20 circular in form having bolted thereto an annular sleeve 21 and a central collar 22. Bearings 23 are provided in the collar for the reciprocating shaft 6. Placed around the sleeve 21 are a plurality of spacer rings superposed one upon another. The intermediate spacer rings are identical and each is shown at 25. There is a bottom spacer ring 26 and a top ring 27. The rings 26 and 27 may or may not be called spacer rings but in any event they perform some of the functions of the spacer rings. Each spacer ring (Fig. 6), is provided with a plurality of circumferentially arranged notches 30 with cut away or thinned portions forming channels 31 in alignment with the notches. The notches in the several rings are in alignment and projecting through the notches are a plurality of posts. There may be eight of such posts equally distributed circumferentially. These posts are, in effect, draw bars or actuators for the yieldable work engaging elements. Such a draw bar is shown at 35 and it has a head 36 operating in a recess 37 of the rest plate 20 and normally urged into an upward position, as Fig. 4 is viewed, by a spring 38. The post is held against turning by a screw 39, the end of which operates in a keyway in the post. The post has a plurality of hook elements 40. These hook elements turn down slightly as Fig. 4 is viewed, and the upper end of the post is provided with a rounded head 41.

The individual yieldable work engaging elements are in the form of springs, and one is shown in Figs. 8, 9, 10 and 11. Each of these elements is of suitable spring steel formed to provide a portion 44 and an end portion 45 with a down-turned flange part 46 formed on a radius substantially corresponding to the radius of the inside surfaces of the work pieces. Each spring element has a central opening 47 defined by the portions 44 and 45 and by side portions 48. Extending from the portion 44 are fingers 50. A plurality of such spring elements are circumferentially arranged relative to the spacer rings, as shown in Fig. 4. The portions 44 lie in the channels 31 of the spacer rings and the fingers 50 project upwardly between the respective spacer rings and the sleeve 21 in clearance spacers 52 provided therefor. The openings 47 align with the openings 30 in the spacer rings. The outer portions 46 of the yieldable elements project radially outwardly beyond the outer periphery of the spacer rings. The actuator posts, of course, extend through the openings in the several aligned spring elements, and the several hook portions 40 lie above the portions 45 of the springs, as shown in Fig. 4.

Figure 3:
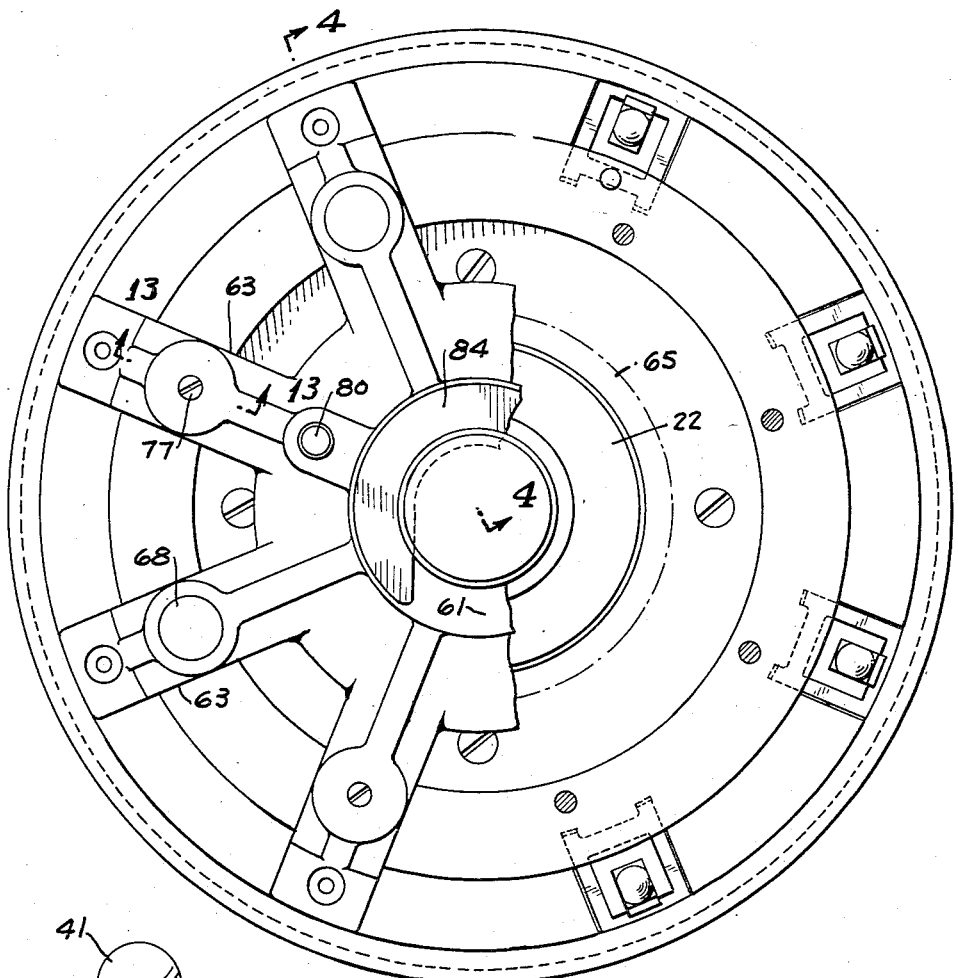
Fig. 3 is a view looking at the top of the structure shown in Fig. 1 with the top spider or cover removed thus showing the inner spider.
Figure 12:
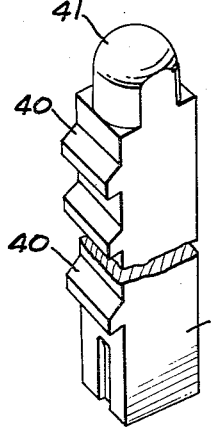
Fig. 12 is a view illustrating an actuating member for flexible work holding element.
Figure 13:
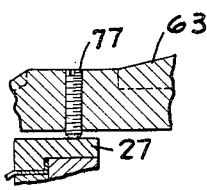
Fig. 13 is a sectional view taken on line 13—13 of Fig. 3 showing a limit screw.

There is an element which conveniently is in the form of a spider and is generally indicated at 60 which has a hub portion 61 located on the shaft 6, as by means of a bearing 62, and having a plurality of arms 63. The member 60 has a sleeve 65 telescoping over the collar 22 serving to pilot the member 60 in its vertical movements. Limit screws 66 (Fig. 4) are threaded into the annular sleeve 21 and slidably pass through apertures of alternate arms 63 with the heads 67 thereof disposed in recesses. To keep dirt out, the recesses may be closed by caps or plugs 68. These screws serve to limit the upward movement of the member 60. Alternate arms of the member 60 are provided with limit screws 77 (Figs. 3 and 13) adapted to engage the top ring 27 to limit the downward movement of the member 60. Each arm is provided with a socket or bearing 64 for cooperation with the bearings 41 on the several draw bars or posts. The bearing 41 may be of spherical form as may be the bearing 64.

Figure 2:
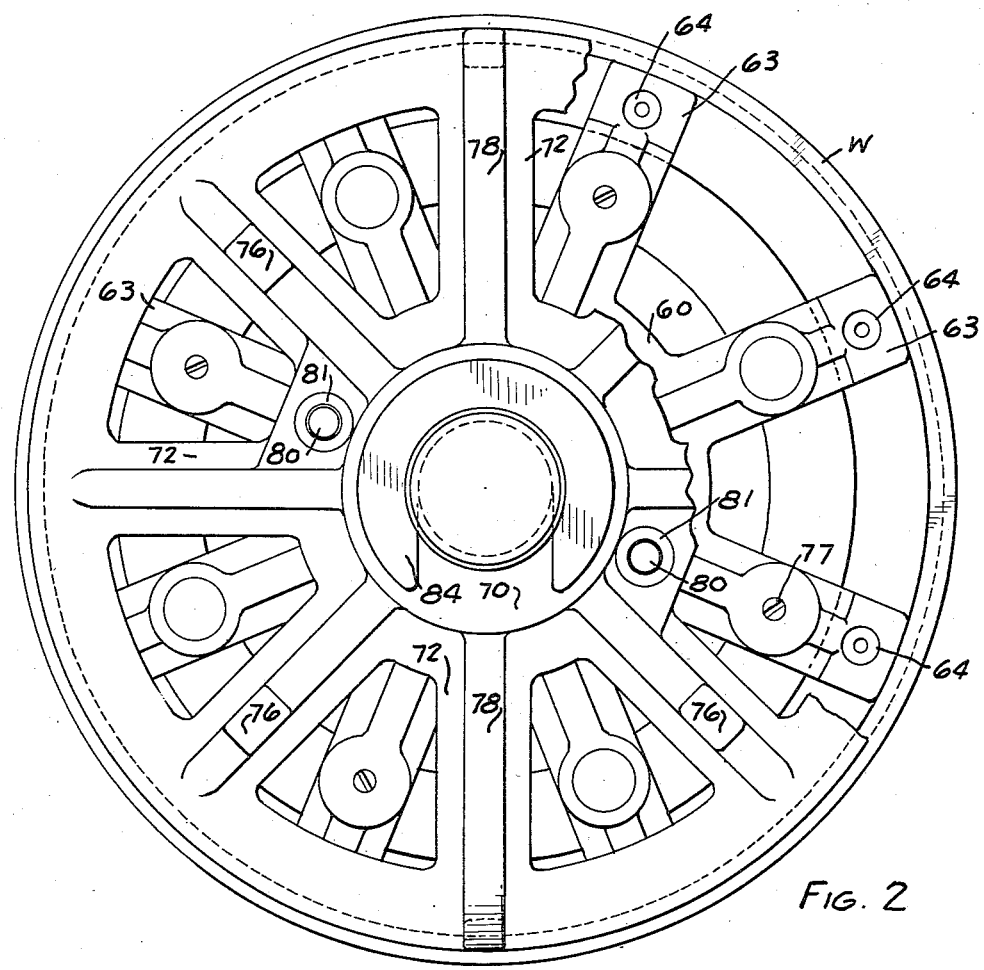
Fig. 2 is a top plan view of the structure shown in Fig. 1 with some parts cut away to show underlying structure.

There is a removable top piece 69 which may be of spoke formation having a hub portion 70 which may be fitted with a bearing 71, and spokes 72 radiating from the hub portion and connecting to a peripheral portion 73. This top portion fits over the shaft as shown and it is equipped with a clamping ring 74 adapted to engage the uppermost work piece (Fig. 1). The clamp ring is secured to the top member by cap screws 75 so that the clamp ring forms a part of the top member. Some of the spokes 72 are provided with accurately machined surfaces 76 for gauging purposes. Parallel to two of the spokes are handles 78 for the purpose of removing and replacing the top member. The inner spider 60 is provided with two upstanding studs 80 (Fig. 2) and the top member is provided with openings with suitable bearings 81 to be received by the studs 80. Thus when the top member is placed in position it is located with reference to the inner spider so that the spokes of the inner spider and the top member are staggered or offset from each other as shown in Fig. 2. There is a force transmitting member 84 shown in Fig. 2 as being of C shape. This member can be placed into the groove 13 and into the groove 12 in the manipulation of the apparatus.

In considering the operation of the apparatus reference may be had first to Fig. 4. The upper member 70 is removed and the C shaped washer 84 is in the groove 12 under the head 15. At this time, the hydraulic medium or compressed air is entered into the top of the cylinder 7 and the shaft 6 is pulled downwardly. This, through the C washer 84, urges the spider 60 downwardly and as a result, each of the posts 35 are urged downwardly. The several hooks 40 on each post engage their respective portions of the spring elements and flex the spring elements downwardly thus reducing the outside diameter of the spring elements. The particular function of the spring elements will be discussed later. With the parts in the position shown in Fig. 4, the several work pieces may be slipped into position with the bottom work piece resting on the rest plate 20. The motor is now reversed thus elevating the spider 60 and the several spring elements flex toward their normal position and the portion 46 of each spring element engages the surface at the inner diameter of the respective work pieces. Each spring element is thus individually free in its function of flexing, and each horizontal series of spring elements engage the inner surface of one work piece. Thus each individual work piece is centered by the expanding springs irrespective of differences in internal diameter due to permissible tolerances, etc. The springs 38 under the posts serve to elevate them within the limit permitted by the screws 66.

When the work pieces are relatively small in cross section in proportion to their inner and outer diameters and width, they are subject to the characteristic of going out of round after being properly machined. When such pieces are placed in position and the spring elements expand, all spring elements increase uniformly in diameter. This results in some of the spring elements or expanders first contacting the inner periphery of an out of round work piece where the work piece is of smallest diameter. The forces thus applied expand the work piece thus increasing its smaller diameter and bringing the work piece into substantially true circular form with all of the expanders contacting the inner periphery of the work piece. Thus such work pieces are rounded and at the same time centralized. This occurs independently with each work piece. The shoulder stop screws 66 prevent the flexible elements from moving to a completely free position. The limit screws 77 limit the downward travel of member 63 and thus limit the extent of the flexing or contracting of the expanders. The expanders are ground so that when extended to the permissible limit they define each a segment of a diameter somewhat greater than the high limit of the interior diameter of a truly round work piece. The outer diameter of the spacer rings 25 and 26 is accurately formed to permit the smallest diameter of an out of round work piece to pass thereover. When the expanders are contracted the outside diameter defined thereby is preferably slightly less than the outside diameter of the spacer rings. Thus when work is placed over the expanders and removed therefrom, there is no frictional engagement with the outer portions 46 of the expanders and this prevents wear on these surfaces and maintains accuracy. The expanders exert sufficient force to round out such work pieces as they flex from contracted position toward expanded condition.

The C washer 84 may now be removed at which time the spider 60 merely rests upon the posts 35, and now the top spider is placed in position, as shown in Fig. 1. With the top member on spider in position, the C washer 84 is disposed in the groove 13 under the head 14 and over the hub 70. The motor is now actuated to pull the shaft 6 downwardly and this pulls the top member downwardly and the clamping ring 74 engages the top work piece and strongly clamps all work pieces in position so that they are held strongly located. It is to be borne in mind that the individual work pieces were previously centered and that the clamping pressure merely holds the work pieces in their pre-centered position. Work may now be performed upon the plurality of work pieces while so held, as for example, by the gear hobbing tool 1 or, for that matter, any other sort of machine, dressing, grinding, or treating operation.

After work has been performed on the pieces, the shaft 6 is elevated, the C washer 84 removed and the top member removed. The C washer 84 is then placed in groove 12 and shaft 6 moved downward thus flexing and contracting the expanders so that the finished work pieces may be slipped off over the inner spider and new work piece blanks inserted.

In describing the structure and the operation, such terms as "lower," "vertical," "upper," etc., have been employed as this was convenient since Fig. 1 and other figures show the shaft 6 in vertical position. These terms are all relative and the invention can be incorporated in an apparatus where the shaft 6, for example, might be horizontal.

The manner of function of the individual spring elements and the structure thereof is as follows: Preferably the fingers 50 are fashioned so as to be somewhat less than 90° from the portion 44 (Fig. 9). Considering the portion 44 as horizontal, the fingers 50 may be about 3° or 4° off vertical so that the angle is about 86° or 87°. Thus, when the spring elements are mounted, as shown in Fig. 5, and located between the spacer rings, the fingers are flexed and urged substantially into a right angular position between the sleeve and the spacer so that the spring elements are tightly in position to thus eliminate any lost play or looseness in their function. When expanded to the limit permitted, the flexible element, referring to Fig. 11, will be in a position about as indicated at $a$. When contracted or flexed to the permitted limit, the position may be at about a position as indicated at $b$, this being the loading and unloading position. The surfaces at 46 are preferably ground to provide an accurate surface and the grinding is preferably done in such manner as to obtain an optimum condition for best engaging the interior surfaces of the rings in different positions of the member. The face 46 may be ground to provide two surfaces 46' and 46''. This may be accomplished by a first grinding operation when the spring is flexed to a position indicated at $c$ about midway between positions $a$ and $b$ followed by a second grinding operation when the spring is flexed to about position $b$.

The manner in which individual rings are centered irrespective of their internal diameter is illustrated in Fig. 5. This, of course, indicates some exaggeration. In this figure the upper work piece has an internal diameter greater than the one underlying it and the spring engaging element has expanded more than the spring engaging element for the next underlying ring. The next lower ring represents an intermediate condition. In any event, the rings are gripped and centered from their internal surface irrespective of variations in the internal diameter to the end that the outer peripheral surfaces thereof are in accurate alignment as indicated. Thus, gear teeth of several such work pieces are uniform as to their diameter at the crests of the teeth and at the base thereof with respect to their inner diameter.

I claim:

1. An apparatus for holding a plurality of work pieces of annular form for the performance of operations thereon comprising, a support for receiving a plurality of work pieces in superposed relationship, a plurality of spacer rings mounted on the support, an annular array of yieldable work engaging elements associated with each spacer ring, the spacer rings having openings therethrough, posts extending through the openings and having hook portions thereon for engaging the yieldable elements, means for shifting the posts for flexing the yieldable elements to reduce the diameter of the annular arrays thereof so that the work pieces may be placed thereover, and for releasing the posts for the flexing of the yieldable elements so that the yieldable elements in each annular array engage and position a work piece, and means for clamping the superposed work piece on the support.

2. The apparatus as described in claim 1 characterized in that each yieldable element has an opening therein for the passage of a post therethrough.

3. The apparatus as described in claim 1 characterized in that there is a central sleeve and that the spacer rings are positioned around the sleeve, and the yieldable elements are positioned between the spacer rings to project radially outward therefrom and have finger portions engaged between the spacer rings and the sleeve to anchor the yieldable elements.

4. An apparatus for holding a plurality of work pieces of annular form comprising, a support, a plurality of superposed spacer rings mounted on the support, a plurality of groups of yieldable elements associated with the spacer rings and projecting radially outwardly therefrom, each group being in an annular array, the inner ends of the yieldable elements being anchored relative to the spacer rings, the spacer rings having openings therethrough, the yieldable elements having openings in alignment with the openings in the spacer rings, a plurality of posts with each post extending through aligned openings in the spacer rings and yieldable elements, each post having a plurality of projections thereon, each arranged to engage a yieldable element, the outer peripheral portions of the yieldable elements being arranged and constructed to engage the inner surfaces of an annular work piece, means for shifting the posts axially so that the projections engage the yieldable elements and flex the same to reduce the diameters of the annular arrays so that annular work pieces may be placed thereover and on the support in superposed relationship, and for releasing the posts so that the yieldable elements flex and engage and center the work pieces, and means for clamping the centered work pieces on said support.

5. The apparatus as described in claim 4 characterized in that there is spring means acting upon each post in opposition to the force of the means for shifting the posts.

6. The apparatus as described in claim 4 characterized in that there is an actuating member common to all posts and means for shifting the actuator member to shift all posts for the flexing of the yieldable elements.

7. An apparatus for holding a plurality of work pieces of annular form comprising, a support, an axially disposed operating shaft, a plurality of groups of yieldable elements with the elements in each group arranged in an annular array and in superposed relationship, a plurality of axially extending posts yieldably carried by the support, each post having a plurality of projections each arranged to engage a yieldable element, an actuating member operatively associated with said posts, means for establishing an operable connection between the shaft and actuating member, means for shifting the shaft so that the actuating member shifts the posts, whereby the projections thereon engage and flex the yieldable elements to reduce the diameters of the annular arrays so that annular work pieces may be placed thereover and on the support and for shifting the shaft for the release of the yieldable elements, whereby the yieldable elements engage the annular work pieces to position and center the same, a clamping element, and means for operably connecting the shaft with the clamping element, whereby movement of the shaft causes the clamping element to clamp the superposed work pieces on said support.

8. The apparatus as described in claim 7 characterized in that the shaft has at least one annular recess and the means for operably connecting the shaft and actuating member is a C shaped washer insertable in a recess and engageable with the actuating member.

9. The apparatus as described in claim 8 characterized in that the clamping member is removable and the means for establishing an operative connection between the clamping member and the shaft is a C shaped washer insertable in an annular recess in the shaft and engageable with the clamping member.

10. An apparatus for holding a plurality of work pieces of annular form for the performance of operations thereon comprising, a support for receiving a plurality of work pieces in superposed relationship, a plurality of spacer rings mounted on the support, an annular array of yieldable work engaging elements associated with each spacer ring, means for flexing the yieldable elements to reduce the diameter of the annular arrays thereof, whereby the work pieces may be placed thereover, and for releasing the yieldable elements for the flexing thereof so that the elements of each annular array engage the inner surface of a work piece to position and centralize it, means for limiting the extent of the flexing of the yieldable elements, means for limiting the expansion of the yieldable elements when released, and means for clamping the positioned work pieces on said support.

11. An apparatus for holding a plurality of work pieces of annular form for the performance of operations thereon comprising, a support for receiving a plurality of work pieces in superposed relationship, a plurality of spacer rings mounted on the support, an annular array of yieldable work engaging elements associated with each spacer ring, the yieldable elements associated with each spacer ring defining a diameter when expanded greater than the spacer ring, means for flexing the yieldable elements to reduce the diameter defined by the annular arrays to less than that of the respective spacer rings whereby annular work pieces may be placed thereover, and for releasing the yieldable elements for their expansion so that the elements of each annular array engage the inner surface of a work piece to position and centralize it, and means for clamping the positioned work pieces on said support.

12. The apparatus as described in claim 11 characterized in that the yieldable elements of each annular array exert sufficient force against the inner surface of an annular work piece whose cross section is relatively small in proportion to its inner and outer diameters and width to round out an out of round work piece and centralize it.

13. The apparatus as described in claim 11 characterized in that each annular array of yieldable elements define a diameter less than the respective spacer rings when the yieldable elements are flexed and define a diameter greater than the respective spacer rings when the yieldable elements are released and expanded.

14. The apparatus as recited in claim 13 characterized in that there is means for limiting the flexing of the yieldable elements to reduce the diameter defined thereby and means to limit the expansion of the flexible elements when they are released by the flexing means.

15. An apparatus for holding a plurality of work pieces of annular form for the performance of operations thereon comprising a support for receiving a plurality of work pieces in superposed relationship, generally cylindrical spacer means mounted on said support, a plurality of annular arrays of yieldable work-engaging elements associated with said spacer means, each annular array of said yieldable elements defining a diameter when expanded greater than the spacer means, means for flexing the yieldable elements to reduce the diameter defined by the annular arrays to less than that of the spacer means, whereby annular work pieces may be placed over said spacer means and for releasing the yieldable elements for their expansion so that the yieldable elements of each annular array engage the inner surface of a workpiece to position and centralize it, and means for clamping the positioned work pieces on said support.

16. An apparatus for holding a plurality of work pieces of annular form for the performance of operations thereon comprising a support for receiving a plurality of work pieces in superposed relationship, generally cylindrical spacer means mounted on said support, a plurality of annular arrays of yieldable work-engaging elements mounted on said spacer means, each said yieldable element having the inner end thereof fixed relative to said spacer means, each annular array of said yieldable elements defining a diameter when expanded greater than the spacer means, means for flexing the yieldable elements to reduce the diameter defined by the annular arrays to less than that of the spacer means, whereby annular work pieces may be placed over said spacer means and for releasing the yieldable elements for their expansion so that the yieldable elements of each annular array engage the inner surface of a work piece to position and centralize it, and means for clamping the positioned work pieces on said support.

References Cited in the file of this patent
UNITED STATES PATENTS

| | | |
|---|---|---|
| 1,772,082 | Hoern | Aug. 5, 1930 |
| 1,944,255 | McFall et al. | Jan. 23, 1934 |